United States Patent
Coultrup

(10) Patent No.: US 7,753,410 B2
(45) Date of Patent: Jul. 13, 2010

(54) TACTICAL SEATBELT QUICK RELEASE SYSTEM

(76) Inventor: Sherri L. Coultrup, 2703 Williamsburg St., Alexandria, VA (US) 22314

( * ) Notice: Subject to any disclaimer, the term of this patent is extended or adjusted under 35 U.S.C. 154(b) by 478 days.

(21) Appl. No.: 11/589,260

(22) Filed: Oct. 30, 2006

(65) Prior Publication Data
US 2008/0054615 A1    Mar. 6, 2008

Related U.S. Application Data

(60) Provisional application No. 60/842,373, filed on Sep. 6, 2006.

(51) Int. Cl.
*B60R 22/32* (2006.01)
(52) U.S. Cl. .................. 280/808; 297/483; 24/182; 24/579.11; 24/633
(58) Field of Classification Search .................. 24/306, 24/442, 663, 163 R, 182, 197, 200, 602, 603, 24/579.11; 224/163; 280/801.1, 808; 297/468, 297/483, 485
See application file for complete search history.

(56) References Cited

U.S. PATENT DOCUMENTS

| 312,085 | A |   | 2/1885 | Claghorn |   |
|---|---|---|---|---|---|
| 2,750,644 | A |   | 6/1956 | Martin et al. |   |
| 3,363,289 | A |   | 1/1968 | Cooper et al. |   |
| 3,676,901 | A | * | 7/1972 | Monti | 24/191 |
| 3,936,092 | A | * | 2/1976 | Dietz | 297/465 |
| 3,950,826 | A |   | 4/1976 | Knoll et al. |   |
| 4,337,913 | A |   | 7/1982 | Booth |   |
| 4,428,102 | A |   | 1/1984 | Brownell |   |
| 4,742,604 | A |   | 5/1988 | Mazelsky |   |
| 4,938,535 | A | * | 7/1990 | Condon et al. | 297/483 |
| 4,966,392 | A |   | 10/1990 | Featon et al. |   |
| 5,121,527 | A | * | 6/1992 | Righi | 24/602 |
| 5,248,187 | A | * | 9/1993 | Harrison | 297/482 |
| 5,769,475 | A |   | 6/1998 | Tylaska |   |
| 5,788,282 | A | * | 8/1998 | Lewis | 280/808 |
| 5,795,030 | A | * | 8/1998 | Becker | 280/808 |
| 5,909,927 | A | * | 6/1999 | Henshall | 297/468 |
| 6,343,841 | B1 | * | 2/2002 | Gregg et al. | 297/468 |
| 6,382,297 | B1 | * | 5/2002 | Takizawa et al. | 160/330 |
| 6,520,392 | B2 |   | 2/2003 | Thibodeau et al. |   |

(Continued)

FOREIGN PATENT DOCUMENTS

EP    614788 A1 *  9/1994

(Continued)

*Primary Examiner*—Paul N Dickson
*Assistant Examiner*—Laura Freedman

(57) ABSTRACT

A tactical quick release seatbelt mechanism that attaches as an after-market enhancement to a pre-existing factory installed seatbelt. The tactical quick release seatbelt mechanism expedites exit from a factory-installed 3-point seatbelt, particularly in an emergency situation. The tactical quick release allows tactical users such as law enforcement, military personnel, drug enforcement personnel, Homeland Security personnel, etc. to exit a vehicle quickly, without delay or snag of tactical equipment (e.g., weapons, communications backpack, etc.) on the 3-point seatbelt, and without the need to take their eye of a given target by looking down for the seatbelt release button. The quick release mechanism inherently provides some extension to the length of the factory installed seatbelt, providing that much more flexibility and maneuverability for the occupant-particularly an occupant that is forward-leaning in the seat because of their wearing a backpack or similar tactical equipment while seated in the vehicle.

8 Claims, 12 Drawing Sheets

U.S. PATENT DOCUMENTS

| | | |
|---|---|---|
| 6,851,160 B2 * | 2/2005 | Carver .................. 24/197 |
| 6,898,829 B2 | 5/2005 | Loe et al. |
| 6,969,122 B2 * | 11/2005 | Sachs et al. ............ 297/468 |
| 2003/0150088 A1 | 8/2003 | Turpin |
| 2007/0000104 A1 * | 1/2007 | Zelmer .................. 24/633 |

FOREIGN PATENT DOCUMENTS

| | | | |
|---|---|---|---|
| GB | 2066346 A | * | 7/1981 |
| JP | 63082858 A | * | 4/1988 |

* cited by examiner

100

PRIOR ART

TACTICAL SEATBELT QUICK RELEASE SYSTEM

This application claims priority from U.S. Provisional Patent Application No. 60/842,373, filed Sep. 6, 2006, entitled "Tactical Seatbelt Quick Release System" to Coultrup, the entirety of which is expressly incorporated herein by reference.

BACKGROUND OF THE INVENTION

1. Field of the Invention

This invention relates generally to automotive safety systems. More particularly, it relates to seatbelt systems and post-factory equipment to improve safety of the seatbelt system, particularly for tactical use.

2. Background of the Related Art

Seatbelts are essential equipment installed at the factory in vehicles. General seatbelt use goes back as far as 1849— before the invention of the automobile. One early U.S. patent for a seatbelt is U.S. Pat. No. 312,085, issued in 1885, entitled "Safety Belt".

Early automobiles used a lap belt, or 2-point seatbelt. The lap belt 2-point seatbelt was a basic restraint system comprising a seatbelt anchored at two attachment points. The lap belt 2-point seatbelt was intended for use generally across the vehicle occupant's hips and thighs.

Modern automobile manufacturers now factory-install what is known as the lap and shoulder seatbelt, or 3-point seatbelt. The first lap and shoulder 3-point seatbelt was introduced by Volvo in 1959, and became standard equipment in all vehicles manufactured in the United States two decades later. A lap and shoulder 3-point seatbelt (also called a combination belt) comprises both a lap portion and a shoulder portion, and in total is anchored at three points (one shoulder, two hips). The 3-point seatbelt restrains the occupant at the hips/thighs as well as across the shoulder.

FIG. 11 shows a depiction of the relevant portion of a conventional 3-point seatbelt 130, with a male latch 132 on the fabric seatbelt 134 secured into a female latch connector 135 that is in turn bolted to the vehicle at point 137, as are the two ends 138, 139 of the fabric seatbelt 134.

Some vehicles have a female latch connector 135 with a quick release button on the side of the latch connector 135. Other vehicle designs include a female latch connector 135 with a quick release button on top of the latch connector. Some release buttons take little pressure to actuate release of the seatbelt, while other release buttons require more pressure on the button to actuate, particularly when the seatbelt is experiencing tension due to the seatbelt being very tight around the occupant.

Automobiles have many uses, most of which relate to the general population who drives them to work, school, mall, market, vacation home, etc. The needs of this main market tends to drive the design of automobiles, including seatbelt design. However, a smaller number of automobiles are employed for use in tactical applications such as by police, military, drug enforcement, or Homeland Security personnel.

In many tactical applications, a rider sits in a vehicle with a forward-leaning posture because of equipment that they are carrying. For instance, fully (or even partially) equipped military personnel may be driving a vehicle in a war zone while wearing weaponry, communications gear, backpack, body armor, etc. Police may be operating a vehicle carrying a waist or shoulder mounted weapon or communications gear. Drug enforcement officers and Homeland security personnel may also be carrying gear and/or weaponry while driving a vehicle.

Use of a conventional 3-point seatbelt in such tactical applications may cause more risk to the occupant than the safety it provides. This is particularly true where the occupant may need to quickly exit the vehicle. Police officers are much less likely to wear the 3-point seatbelt in a tense and unpredictable situation, particularly when involved with an armed person, so they don't waste precious seconds or even fractions of a second in the event that they fumble in reaching for the release button for the 3-point seatbelt. Even worse, the tactical occupant may need to look down to find the seatbelt release button, taking their eye off a target, and again either risk their lives to a greater threat in those split seconds, or risk loss of sight of an evasive target.

In military situations, it is believed that a significant number of military deaths have occurred in vehicles because the occupant opted to not wear their seatbelt so that they could quickly duck or exit the vehicle when encountering enemy fire. Particularly in military situations, split seconds lost trying to locate the seatbelt release button, or worse yet the need to look down to locate the seatbelt release button, may cost the occupant their life to enemy fire. As a result, a tactical person wearing military gear may decide that in the balance, it is 'safer' to their life to not wear the 3-point seatbelt at that time lest they fall victim to the greater tactical threat.

There are even more practical realities that cause a tactical occupant to opt to not wear their seatbelt. For instance, the tactical occupant might be wearing a waist-mounted firearm that could get tangled within the factory-installed 3-point seatbelt, causing a risk of entanglement with the weapon, unintended discharge of the weapon, or worse.

Conventional 3-point seatbelt release mechanisms may not always permit law enforcement, military personnel and other tactical operators wearing body armor, weapons belts, and/or other equipment to rapidly release their seatbelt in an emergency situation. Accordingly, while the recognized safety benefits of 3-point seatbelts are incontrovertible, there are some uses of vehicles (e.g., tactical applications) that effectively place the occupant in significant external danger should they not be able to release themselves from the seatbelt allowing them to exit or move within the vehicle at any moment. As a result, the inventor herein has recognized that the occupant of a vehicle in such tactical or similar application may opt to not wear their factory-installed 3-point seatbelt at a time when external risks present a greater danger. Of course, if the occupant is not wearing their seatbelt, they will not be protected by the safety mechanisms associated with such seatbelt use, including unintended ejection from the vehicle in a rollover, proper positioning for airbag deployment, etc.

There is a need for faster release from factory-installed 3-point seatbelts.

SUMMARY OF THE INVENTION

In accordance with disclosed embodiments, a quick release for a factory-installed vehicular seatbelt comprising a male seatbelt latch adapted for insertion into a factory-installed releasable latch connector. A latch adapter is adapted to capture a factory-installed male seatbelt latch. A quick release mechanism between the male seatbelt latch and the latch adapter. The quick release mechanism is adapted to actuate to quickly release the factory-installed 3-point vehicular seatbelt from fixed communication with the factory-installed releasable latch connector.

A method and apparatus to release a securing latch for a factory-installed 3-point vehicular seatbelt comprises pulling a lanyard away from a strap of the factory-installed 3-point vehicular seatbelt to correspondingly release a quick release mechanism securing a latch for the factory-installed 3-point vehicular from a releasable latch connector.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

The inventive tactical quick release seatbelt mechanism attaches as an after-market enhancement to a pre-existing factory installed seatbelt. The tactical quick release seatbelt mechanism expedites exit from a factory-installed 3-point seatbelt, particularly in an emergency situation. The tactical quick release allows tactical users such as law enforcement, military personnel, drug enforcement personnel, Homeland Security personnel, etc. to exit a vehicle quickly, without delay or snag of tactical equipment (e.g., weapons, communications backpack, etc.) on the 3-point seatbelt, and without the need to take their eye of a given target by looking down for the seatbelt release button.

In disclosed embodiments, the quick release mechanism inherently provides some extension to the length of the factory installed seatbelt, providing that much more flexibility and maneuverability for the occupant-particularly an occupant that is forward-leaning in the seat because of their wearing a backpack or similar tactical equipment while seated in the vehicle.

Figure 1:
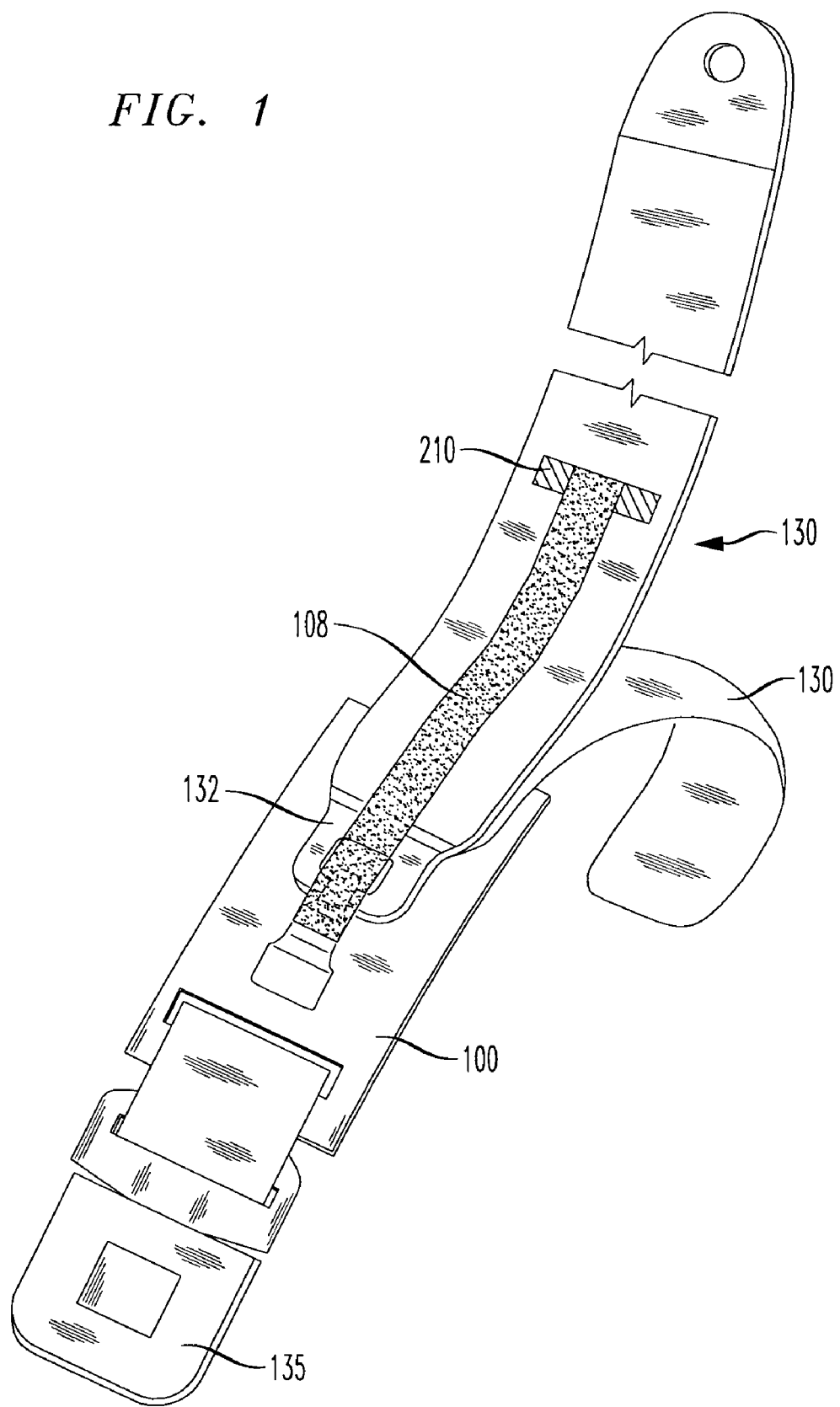
FIG. 1 shows an after-market quick release mechanism installed for use with the relevant portions of an otherwise conventional factory-installed 3-point seatbelt, in accordance with principles of the invention.

FIG. 1 shows an after-market quick release mechanism installed for use with the relevant portions of an otherwise conventional factory-installed 3-point seatbelt, in accordance with principles of the invention.

In particular, as shown in FIG. 1, a tactical quick release mechanism 100 is interjected between the factory installed male latch 132 of the factory-installed seatbelt 130, and the factory-installed female latch connector 135. A cloth lanyard 108 has one end connected to the quick release mechanism 100 to activate release of the quick release mechanism 100 when the cloth lanyard 108 is pulled. The other end of the cloth lanyard 108 is anchored to the seatbelt 130 at an appropriate point, e.g., about half-way up the fabric seatbelt 130.

Figure 2A:
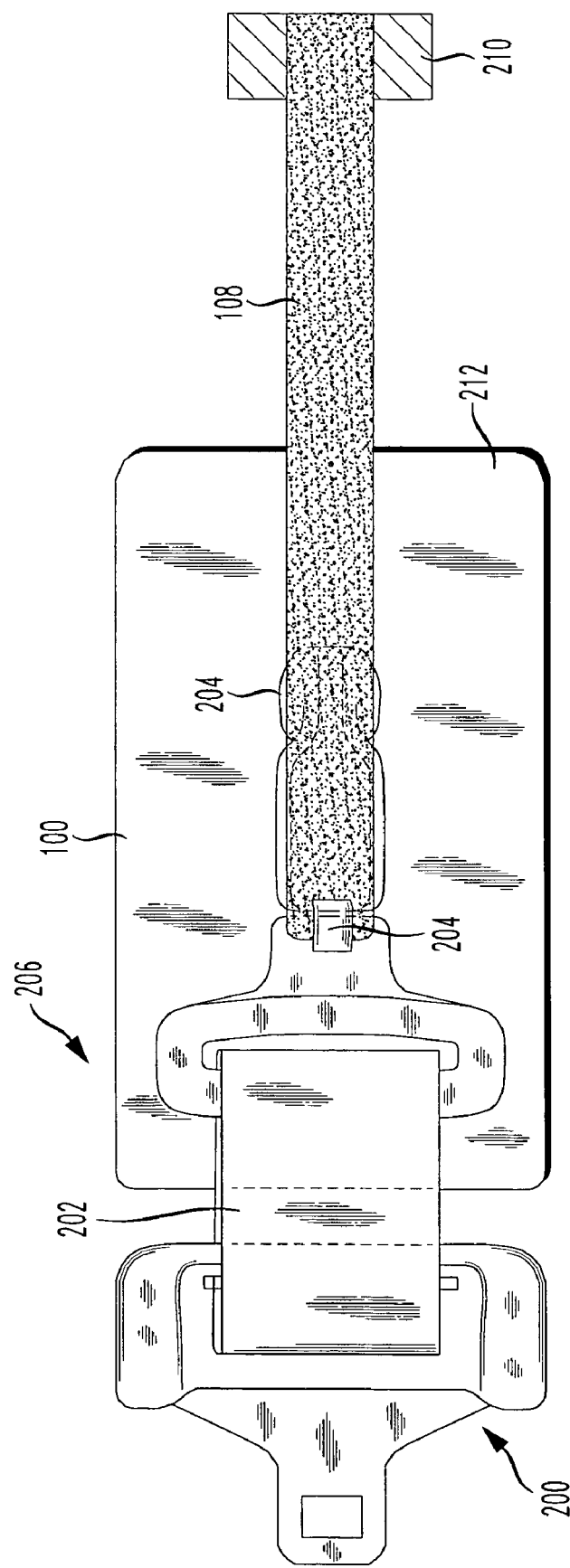
FIG. 2A shows a top view.
Figure 2B:
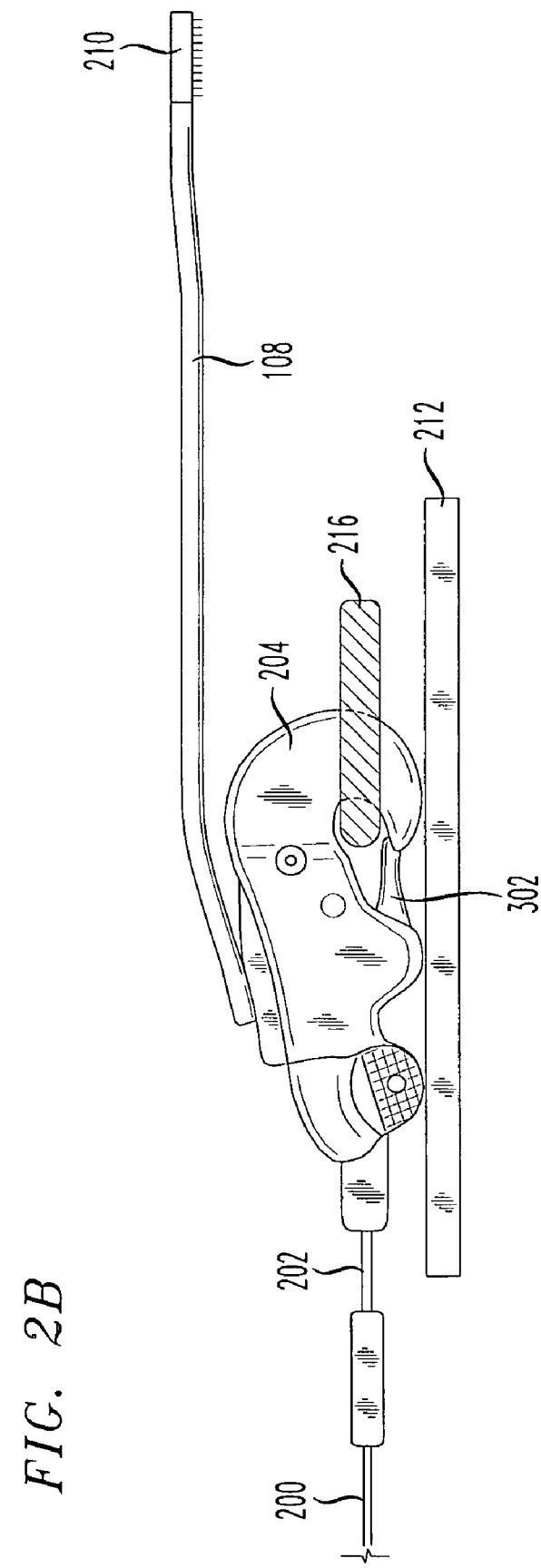
FIG. 2B shows a side view, of an embodiment of the quick release mechanism shown in FIG. 1 in more detail.

FIG. 2A shows a top view, and FIG. 2B shows a side view, of an embodiment of the quick release mechanism shown in FIG. 1 in more detail.

In particular, FIGS. 2A and 2B show a main section 206 of the quick release mechanism 100, and a lanyard 108 anchored between a release trigger for the quick release mechanism 100 and an anchor device 210 anchored at an appropriate location on the factory-installed fabric seatbelt 134. The quick release mechanism 100 contains a quick release device (i.e., a quick separation device).

The quick release mechanism 100 attaches to the factory-installed female seatbelt latch connector 135 using a male latch 200 having a shape suitable to be secured within the factory-installed female latch connector 135.

The quick release mechanism 100 includes an after-market male latch 200 at one end (which is separate from the factory installed male latch 132) and at the other end the releasable hook mechanism 204.

The lanyard 108 is attached to the releasable hook mechanism 204 to quickly open the releasable hook mechanism 204 when pulled. At the opposite end, the lanyard 108 is anchored to an appropriate point on the fabric seatbelt 134 by means of the lanyard anchor device 210. In disclosed In disclosed embodiments, the lanyard anchor device 210 is comprised of a piece of fabric webbing with hook and loop (e.g. VELCRO) fabric sewn onto one side. The friction side (skateboard tape) is placed against the fabric seatbelt 134 and the VELCRO side is facing outward and is used to secure lanyard 108. The VELCRO side of the lanyard anchor device 210 is placed against the fabric seatbelt 134 to secure that end of the lanyard 108 to the respective point on the fabric seatbelt 134.

The fabric lanyard 108 allows the user of the tactical quick release seatbelt to quickly activate release of the seatbelt, without the need to look down and search for the release button of the latch connector 135, and exit the vehicle in an emergency situation. The fabric used to form the lanyard 108 may be, e.g., REO 1″ wide nylon strapping.

The latch adapter 216, in one disclosed embodiment, is a V-shaped attachment that is attached to the factory-installed latch belt buckle 132 of the factory-installed seatbelt 130.

Preferably the quick release mechanism 100 is isolated from the body of the occupant using a divider 212 (e.g., a padded divider). In disclosed embodiments, the divider 212 is a nylon stiffener with padding on the edges and on the side contacting the body of the occupant for comfort.

The divider 212 helps ensure that operation of the quick-release mechanism 100 will not be interfered with by the occupant or their clothes. Padding is preferable on the divider 212, particularly with respect to tactical applications (e.g., police, military, drug enforcement, homeland security, etc.) to help ensure that the quick-release mechanism 100 doesn't get entangled in tactical equipment being worn or carried by the occupant (e.g., gun, backpack, walkie-talkie, etc.)

The hook mechanism 204 is a releasable hook of suitably strong material (e.g., alloy steel or other metal or alloy).

A shown in FIG. 2B, the releasable hook 204 includes a spring latch 302 that holds the latch adapter 216 in place when closed, but when pulled open by the lanyard 108 attached thereto opens the releasable hook 204 quickly, and dumps out the latch adapter 216 to accomplish quick release of the factory-installed latch 132.

Figure 3A:
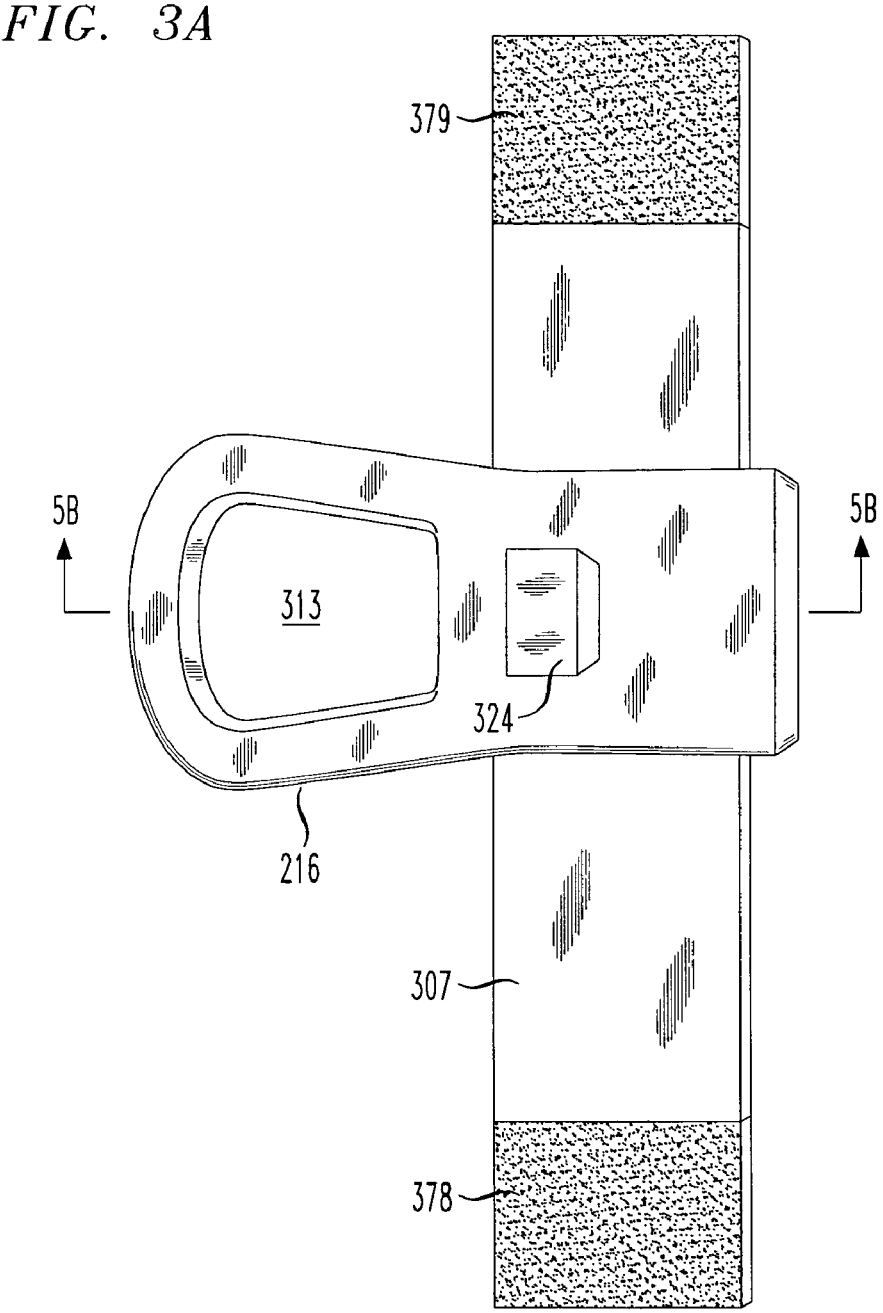
FIG. 3A shows a detailed top view.
Figure 3B:
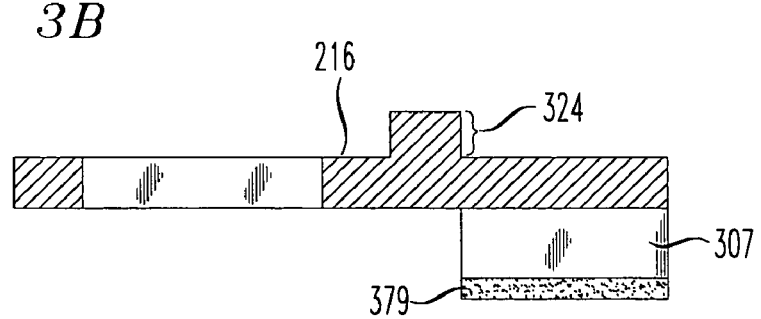
FIG. 3B shows a detailed side view, of an exemplary latch adapter in the quick release mechanism, in accordance with principles of the invention.

FIG. 3A shows a detailed top view, and FIG. 3B shows a detailed side view, of an exemplary latch adapter 216 in the quick release mechanism 100, in accordance with principles of the invention.

Figure 4:
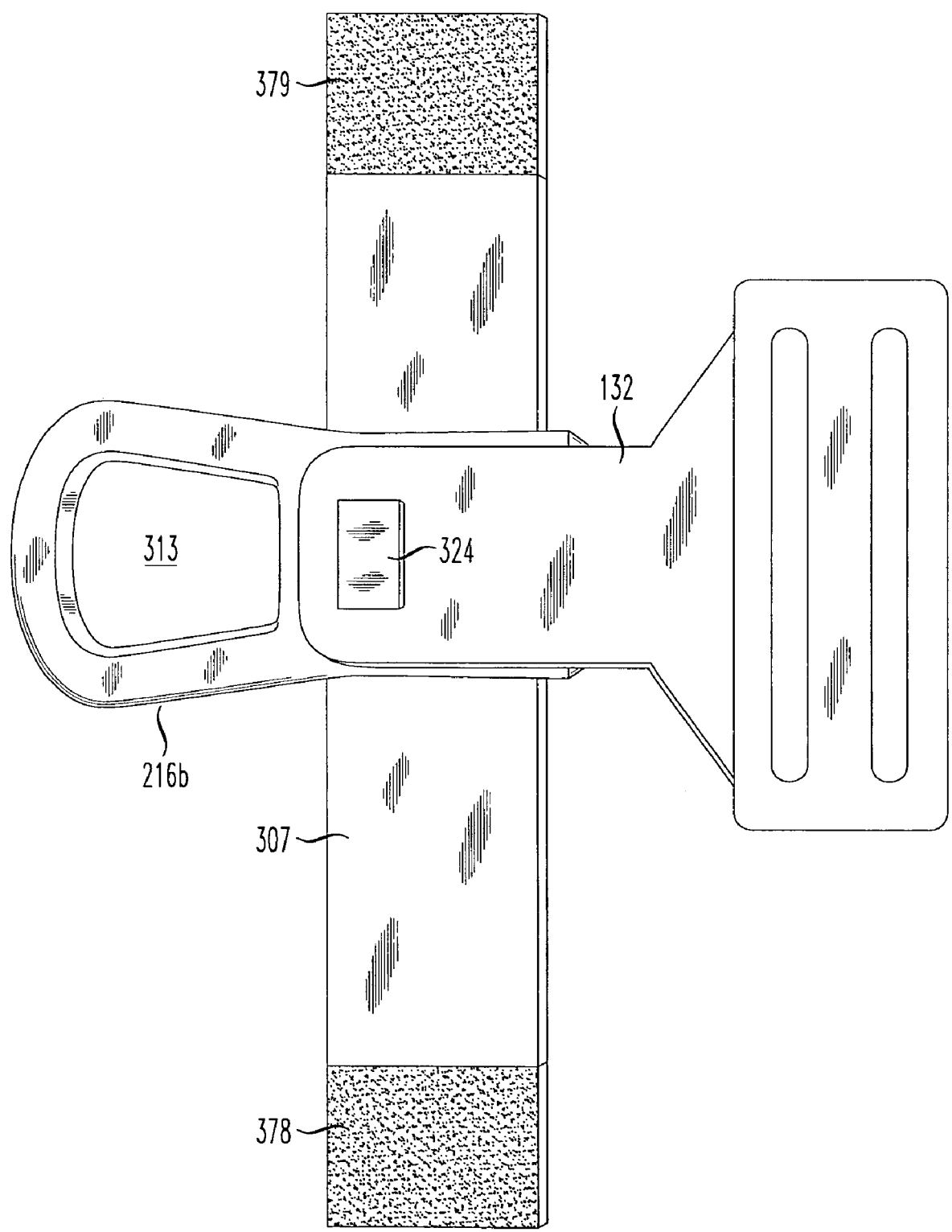
FIG. 4 shows a depiction of the exemplary latch adapter shown in FIGS. 3A and 3B in communication with the male latch seatbelt buckle of a factory-installed seatbelt, in accordance with principles of the invention.

In particular, FIGS. 2A and 2B show a V-shaped latch adapter 216. The V-shaped latch adapter 216 of FIGS. 2A and 2B is secured to the factory-installed latch 132 using a 1" VELCRO strip 307 wrapped around the latch adapter 216 and factory-installed latch 132 keeping both pieces securely locked together, as shown in FIG. 4.

FIGS. 3A and 3B show another way to secure to the factory-installed latch 132.

In particular, as shown in FIGS. 3A and 3B, a latch adapter 216 has an opening 313 allowing the releasable hook 204 to be secured to the latch adapter 216. The latch adapter 216 also includes a raised square portion 324 sized to pass through an opening in the factory-installed latch 132. Once passed through the opening in the latch 132, the latch 132 is secured to the latch adapter 216 by wrapping a suitable nylon (or other material) strap with hook-and-loop (e.g. VELCRO) fastening strap 307. One end of the VELCRO fastening strap 307 includes a pile portion 378, and the other end, on the opposite side, includes a VELCRO portion 379, intended to be secured to one another.

The latch adapter 216 is formed of a suitably strong material, e.g., aluminum or other metal.

FIG. 4 shows a depiction of the exemplary latch adapted 216 shown in FIGS. 3A and 3B in communication with the male latch 132 of a factory installed seatbelt 130, in accordance with principles of the invention.

In particular, as shown in FIG. 4, the factory-installed male latch 132 is mated to a latch adapter 216 by passing the raised square portion 324 through the latch opening in the male latch 132, and secured by wrapping the VELCRO fastening strap 307 around both the mated latch adapter 216 and male latch 132.

Figure 5A:
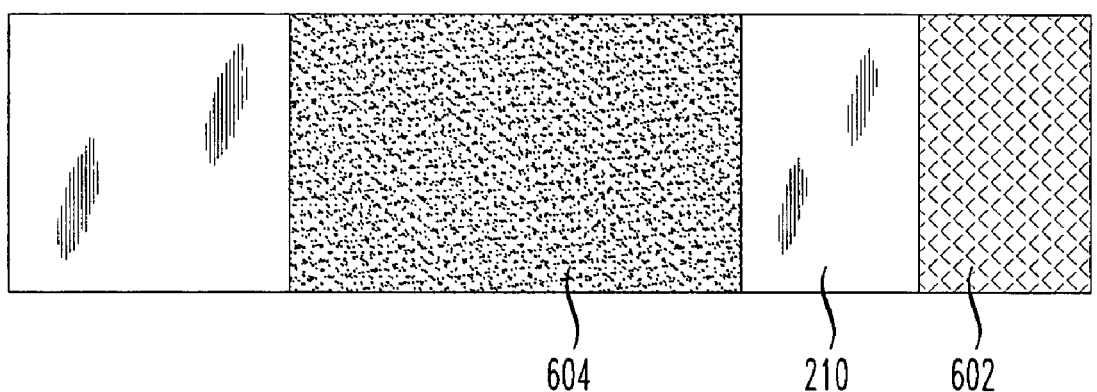
FIG. 5A shows detailed features of the frontside.
Figure 5B:
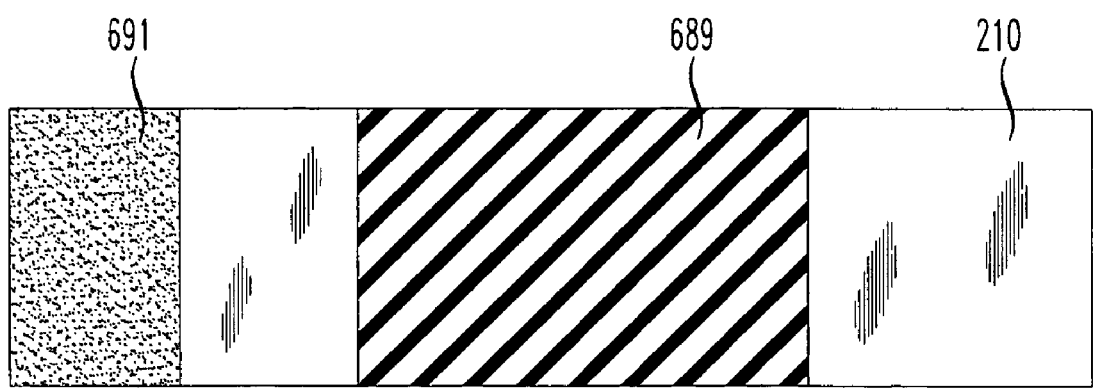
FIG. 5B shows the backside, of an exemplary lanyard anchor, in accordance with the principles of the invention.

FIG. 5A shows detailed features of the frontside, and FIG. 5B shows the backside, of an exemplary lanyard anchor 210, in accordance with the principles of the invention.

In particular, as shown in FIGS. 5A and 5B, while the lanyard 108 may be anchored directly to the fabric factory-installed seatbelt 130 by post-manufacture sewing, a separate lanyard anchor 210 device may be implemented to accomplish the same function-to secure one end of the lanyard to an appropriate point on the fabric seatbelt 130.

The disclosed lanyard anchor 210 is comprised of a nylon webbing strap of material , with appropriately placed hook material 602 and pile material 604 to allow the lanyard anchor 210 to be wrapped around the fabric seatbelt 130 at the appropriate location. The end of the lanyard 108 has VELCRO on it which will attach to the pile material 604.

FIG. 5B shows the rear side of the exemplary lanyard anchor 210 including a friction material such as skateboard tape 689, and a pile portion 691. The skateboard tape 689 provides a lateral grip between the lanyard anchor 210 and the fabric seatbelt 130 when strapped together very tightly.

Figure 6:
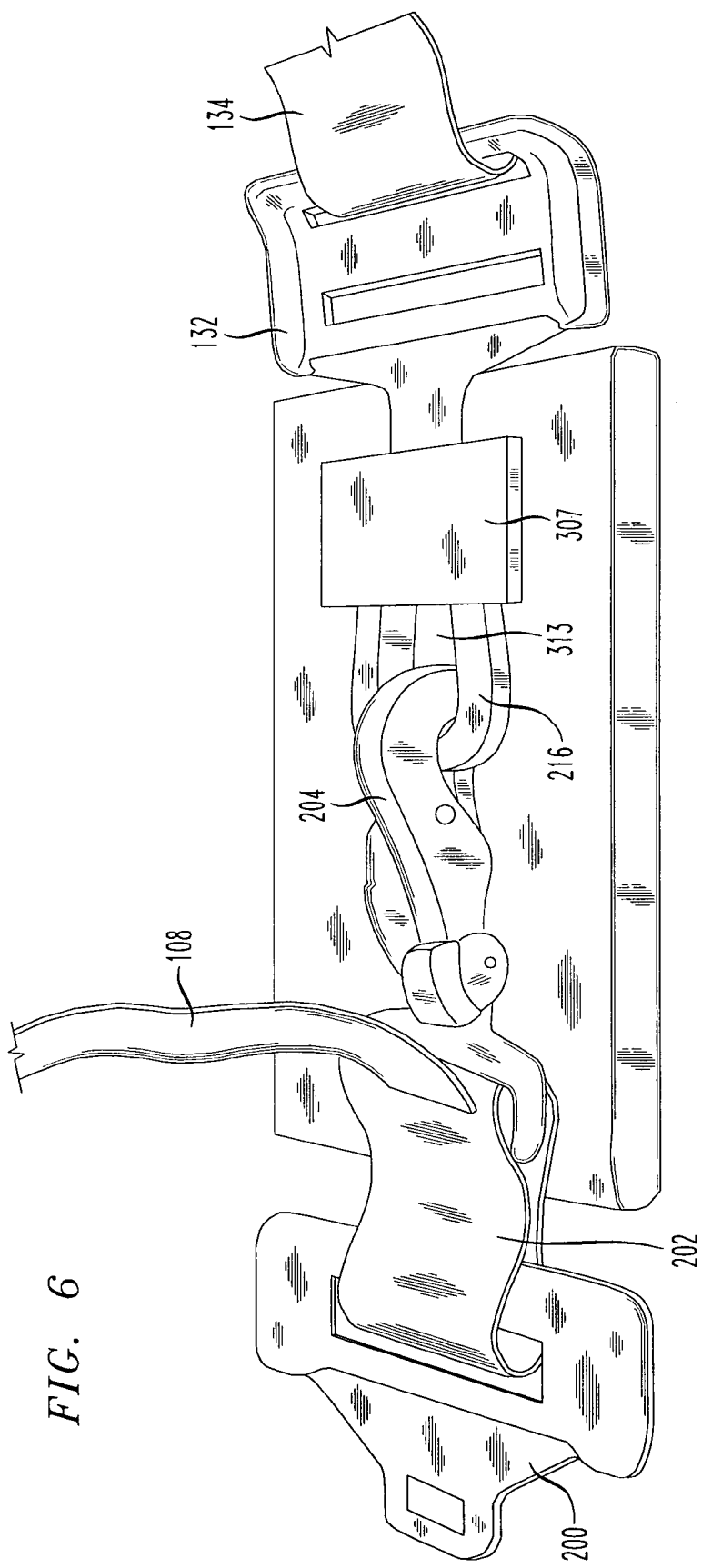
FIG. 6 shows a depiction of an exemplary after-market quick release mechanism secured to an exemplary latch adapter that in turn is secured to the male latch of a factory-installed seatbelt, in accordance with the principles of the invention.

FIG. 6 shows a depiction of an exemplary after-market quick release mechanism secured to an exemplary latch adapter that in turn is secured to the male latch of a factory-installed seatbelt, in accordance with the principles of the invention.

Figure 7:
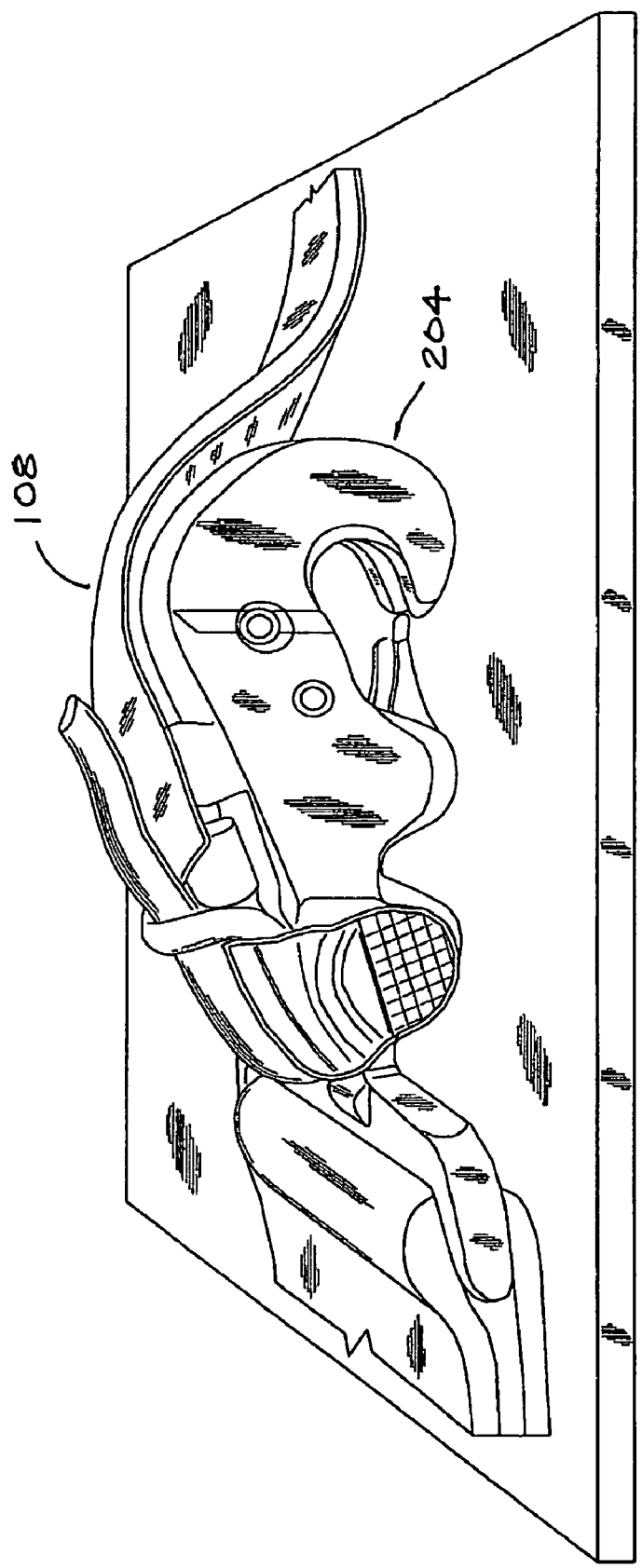
FIG. 7 shows a side view of a prototype after-market quick release mechanism including releasable hook secured to an exemplary latch adapter (V-shaped latch adapter) that in turn is secured to webbing that is secured (via looping through and VELCRO closure) to a factory-installed seatbelt buckle, in accordance with the principles of the invention.

In particular, as shown in FIG. 7, a factory installed seatbelt 134 including a factory-installed male latch 132 is secured to a latch adapter 216 (with fastening strap 307). The latch adapter is hooked by the hook mechanism 204 of the quick release mechanism. Nylon webbing 202 is used to secure the quick release hook 204 to a new seatbelt latch 200 that emulates the factory-installed seatbelt latch 132 by being secured in the factory-installed latch connector 135 (see FIG. 1).

One end of the lanyard 108 is tied around the spring latch 302 of the quick release hook 204. When pulled, the lanyard 108 causes the spring latch 302 to open, and at the same time manually angles the quick release hook 204 causing the quick release hook 204 to pull out from the opening 313 of the latch adapter 216, effectively dumping the latch adapter 216 and affecting quick release.

The tactical seatbelt quick release system functions as follows: sentence: Step 1: Attach the latch adapter 216 to the male factory seatbelt latch 132 of the vehicle's pre-existing factory installed seatbelt 130.

Step 2: Attach the lanyard anchor 210 with anti-slip material 689 on its underside to an appropriate point on the shoulder harness portion of the factory-installed seatbelt 130.

On the outside of the lanyard anchor 2120 is hook-and-loop fastening material 602, 604, 691 that is intended to secure one end of the lanyard 108 to the factory-installed seatbelt 130. While in no way required to work the invention, the color of the material used for the lanyard 108 may be a highly visible color, e.g., red.

The lanyard 108 is affixed to the releasable hook 204 of the quick release mechanism 100.

Step 3: Snap the male end of the after-market seatbelt latch 200 into the factory-installed female latch connector 135.

Step 4: Snap the releasable hook 204 onto the latch adapter 216 making sure that the isolating padding 212 is in between the quick release releasable hook 204 and the body of the driver/passenger.

Step 5: If the lanyard 108 is not attached directly to the VELCRO pile on the factory-installed seatbelt 130, attach the lanyard 108 to a VELCRO fastener of the lanyard anchor 210 using a matching patch of VELCRO on the end of the lanyard 108.

Step 6: When the lanyard 108 is pulled away from the quick release mechanism 100, it releases the spring latch 302 of the releasable hook 204, thereby releasing the latch adapter 216 and factory-installed seatbelt latch 132. While doing this the user can rapidly exit the vehicle, allowing them to respond to an emergency situation.

FIG. 7 shows a side view of a prototype after-market quick release mechanism including releasable hook 204 and lanyard 108 in accordance with the principles of the invention.

Figure 8:
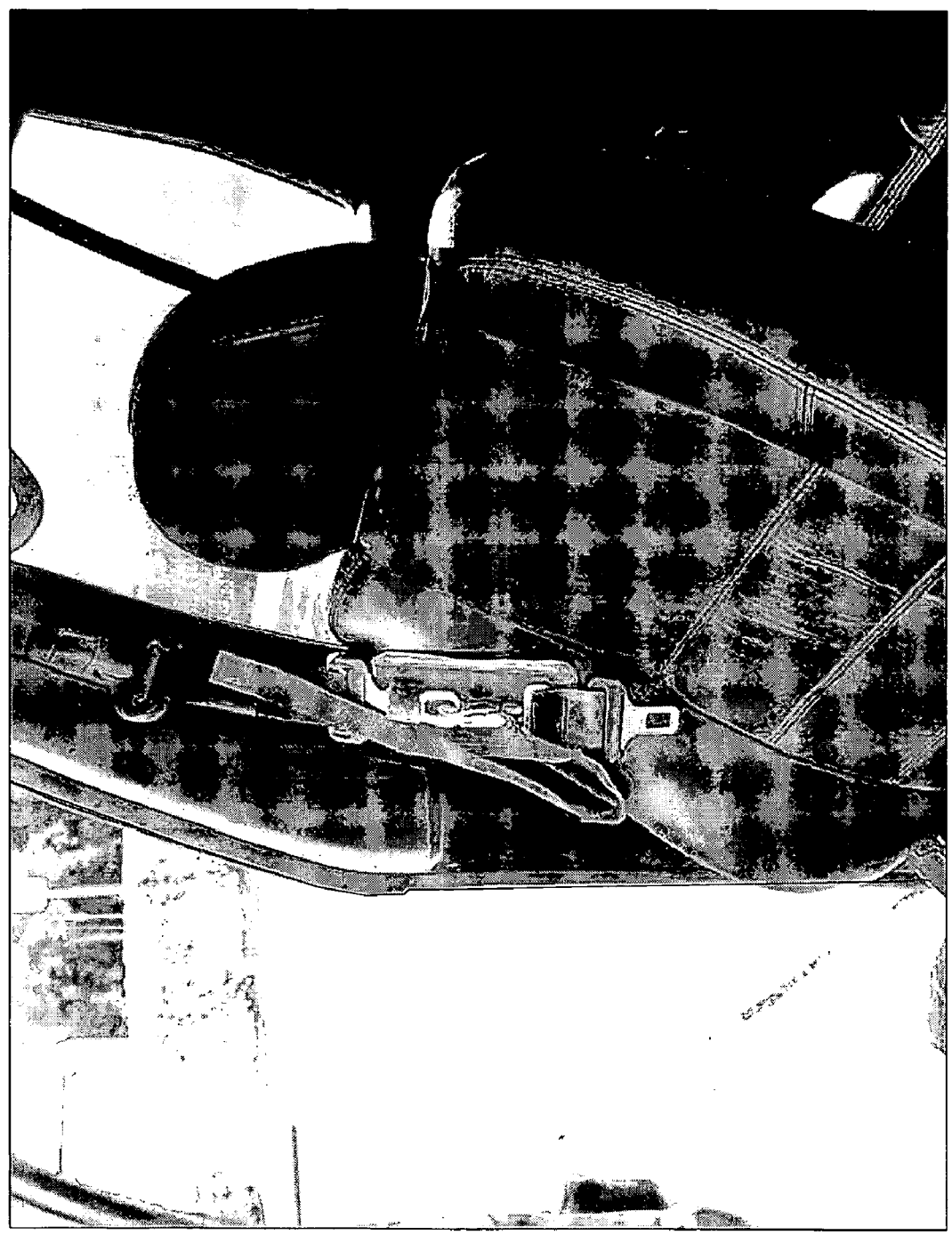
FIG. 8 is a photo showing a wider view of the prototype-after-market quick release mechanism shown in FIG. 7, in place in a vehicle, ready for entry of an occupant into the seat, in accordance with the principles of the invention.

FIG. 8 is a photo showing a wider view of the prototype after-market quick release mechanism 100 shown in Fig. 7, in place in a vehicle, ready for entry of an occupant into the seat, in accordance with the principles of the invention.

Figure 9:
FIG. 9 is a photo showing the prototype after-market quick release mechanism shown in FIGS. 7 and 8, in place in a vehicle and latched into the factory installed female latch connector, also showing the lanyard anchor in place secured to the shoulder harness portion of the seatbelt, in accordance with the principles of the invention.

FIG. 9 is a photo showing the prototype after-market quick release mechanism 100 shown in FIGS. 7 and 8, in place in a vehicle and latched into the factory installed female latch connector 135, also showing the lanyard anchor 210 in place secured to the shoulder harness portion of the seatbelt 134, in accordance with the principles of the invention. FIG. 9 shows how the VELCRO end of the lanyard 108 is attached to the pile on the outside of the lanyard anchor 210. The lanyard anchor 210 is wrapped around the seatbelt 134.

Figure 10:
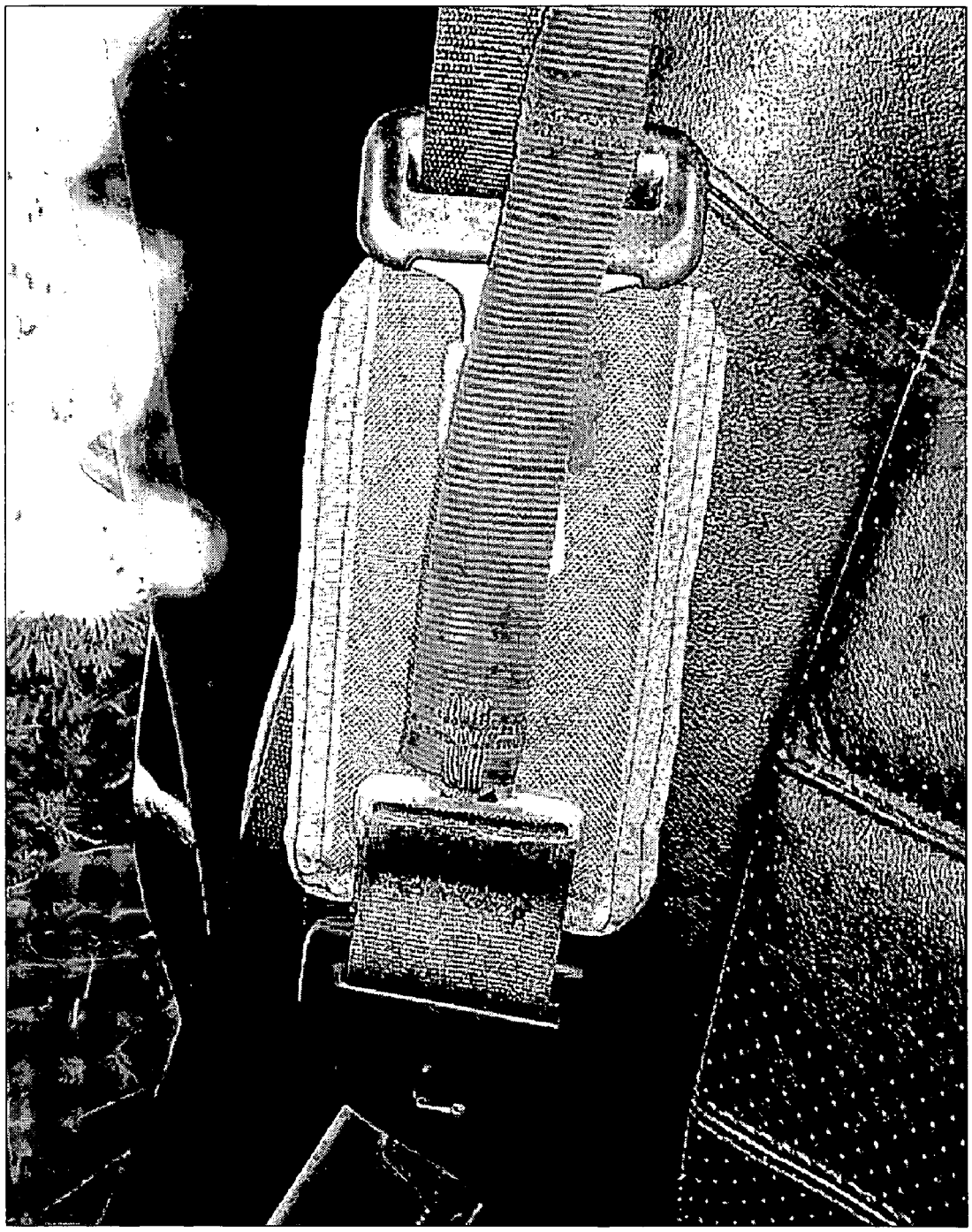
FIG. 10 is a photo showing the prototype after-market quick release mechanism shown in FIGS. 7-9, in more detail surrounding the quick release mechanism, in accordance with the principles of the invention.
Figure 11:
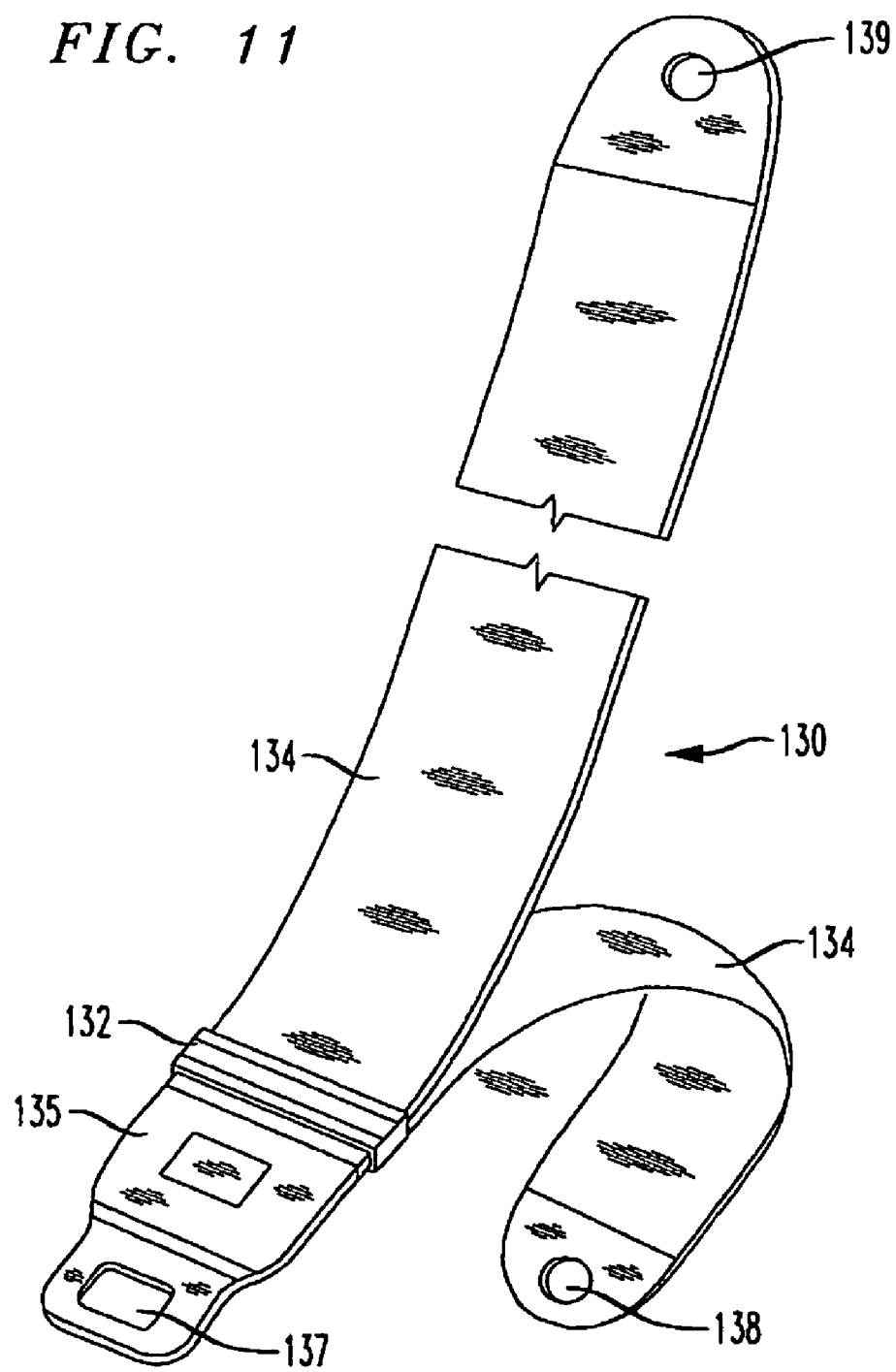
FIG. 11 shows a depiction of the relevant portion of a conventional 3-point seatbelt, with a male latch connector on the fabric seatbelt secured into a female latch connector that is in turn bolted to the vehicle, as are the two ends of the fabric seatbelt.

FIG. 10 is a photo showing the prototype after-market quick release mechanism 100 shown in FIGS. 7-9, in more detail surrounding the quick release mechanism 100, in accordance with the principles of the invention.

While the invention has been described with reference to the exemplary embodiments thereof, those skilled in the art will be able to make various modifications to the described embodiments of the invention without departing from the true spirit and scope of the invention.

What is claimed is:

1. A quick release for a factory-installed 3-point vehicular seatbelt, said seatbelt including a lap belt portion and a shoulder belt portion, comprising:
   a male seatbelt latch adapted for insertion into a factory-installed releasable latch connector;
   a latch adapter adapted to capture a factory-installed male seatbelt latch;
   a quick release mechanism between said male seatbelt latch and said latch adapter; and
   a lanyard, said lanyard having a first end connected to said quick release mechanism and a second end anchored to said shoulder belt portion of said factory-installed 3-point vehicular seatbelt;
   wherein when a user grasps and pulls said lanyard, said quick release mechanism will actuate to quickly release said factory-installed 3-point vehicular seat belt.

2. The quick release for a factory-installed 3-point vehicular seatbelt of claim 1 wherein said lanyard is anchored to said shoulder portion of said factory-installed 3-point vehicular seatbelt by a hook and loop fastener.

3. The quick release for a factory-installed 3-point vehicular seatbelt of claim 1 wherein said lanyard is comprised of a nylon strap.

4. A method to release a securing latch for a factory installed 3-point vehicular seatbelt, said seatbelt including a lap portion and a shoulder portion, comprising:
   a. providing a quick release mechanism;
   b. attaching said quick release mechanism between a male latch on said factory-installed 3-point vehicular seatbelt and a factory installed releasable latch connector;
   c. connecting a first end of a lanyard to said quick release mechanism;
   d. connecting a second end of said lanyard to said shoulder portion of said factory installed 3-point vehicular seatbelt; and
   e. wherein when a user grasps and pulls said lanyard, said quick release mechanism will actuate to quickly release said factory-installed 3-point vehicular seat belt.

5. The method of claim 4 wherein said second end of said lanyard is connected to said shoulder portion of said factory installed 3-point vehicular seatbelt by a hook and loop fastener.

6. The method of claim 4 wherein said lanyard is comprised of a nylon strap.

7. A quick release for a vehicular seatbelt system, said seatbelt system including a lap belt portion, a shoulder belt portion, a male latch positioned on said lap belt portion, and a female latch receiver, comprising:
   a. a male adapter adapted to be received by said female latch receiver;
   b. a female adapter adapted to capture said male latch;
   c. a quick release positioned between said male adapter and said female adapter;
   d. a lanyard, said lanyard having a first end connected to said quick release and a second end connected to said shoulder belt portion of said vehicular seatbelt system,
   wherein when a user grasps and pulls said lanyard, said quick release mechanism
   will actuate to quickly release said vehicular seat belt.

8. The quick release of claim 7 wherein said lanyard is comprised of a nylon strap.

* * * * *